B. J. S. CAHILL.
MAP OF THE WORLD.
APPLICATION FILED MAR. 5, 1912.
1,054,276.
Patented Feb. 25, 1913.
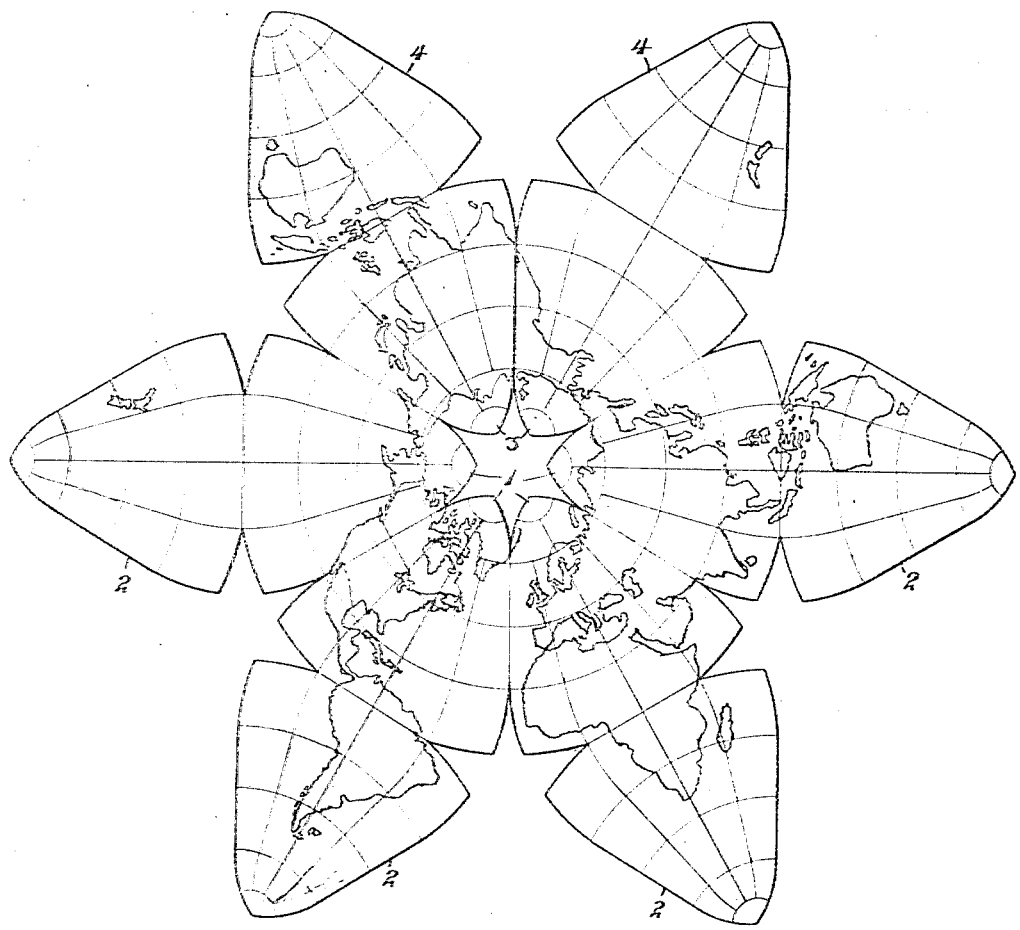
WITNESSES
INVENTOR
B. J. S. Cahill
BY
Jm. Wright
ATTORNEY

UNITED STATES PATENT OFFICE.

BERNARD J. S. CAHILL, OF SAN FRANCISCO, CALIFORNIA.

MAP OF THE WORLD.

1,054,276. Specification of Letters Patent. Patented Feb. 25, 1913.

Application filed March 5, 1912. Serial No. 681,743.

*To all whom it may concern:*

Be it known that I, BERNARD J. S. CAHILL, a subject of the King of Great Britain, residing at San Francisco, in the county of San Francisco and State of California, have invented new and useful Improvements in Maps of the World, of which the following is a specification.

None of the methods of projection and development at present used in forming a map of the earth furnishes a representation of its land surface with any considerable degree of accuracy in regard to relative dimensions of the various parts, or is free from noticeable distortion and exaggeration, and also free from discontinuities of said land surface.

The object of the present invention is to provide a map of the earth which will avoid the above objections.

In the accompanying drawing, the figure is a plan view of my improved map.

Let it be supposed that the surface of a globe representing the earth is divided by three great circles at right angles to one another, one of them being the equator, into eight equilateral right-angled spherical triangles or lobes, namely, four northern lobes 1 and four southern lobes 2. To place on a plane surface these lobes, which are spherical surfaces, they must necessarily be distorted, and it is desirable that this distortion be as small as possible. But before considering the character of this distortion, it is first to be observed that, if the four upper or northern equilateral triangles or lobes 1, are maintained in continuity along a parallel of north latitude 41 degrees, 48 minutes, 21 seconds, that is, if adjacent lobes contact with each other on said latitude, they will, when so distorted into a plane surface, occupy an angular space of 240 degress about the north pole. This permits the remaining angular space of 120 degrees to be exactly filled by two other equal and similar pairs of lobes 3, 4, so that the map assumes a regular hexagonal form. These lobes, in order to more conveniently compare adjacent parts of said surface at the extreme east or west, may be used to contain additional representations of the extreme portions of the land surface already represented in the four main lobes 1.

Now in order to avoid as much as possible, in such a map, discontinuities in the representation of the land surface of the earth, it is first important to carefully select the positions of the two meridional great circles, on which are made the hypothetical divisions, as before explained. It is found at once, that, if one meridional great circle is taken 22½ degrees west longitude and the other, of course, ninety degrees east and west thereof, there will be no noticeable or important discontinuities in the representation of the land surface in the southern hemisphere, the representation of the African continent lying wholly in one lobe, Australia and the southern part of Asia wholly in another lobe, South America wholly in a third lobe, and New Zealand wholly in the fourth lobe. The only discontinuous representations of surfaces are those of water surfaces. To avoid discontinuity of the representation of the land surface in the northern hemisphere and on the equator said equilateral triangles are slightly distorted. Their sides for one-half their length are changed from arcs of circles into straight lines, so that they can be contiguous along one-half their length, the half-length selected for the meridional sides being that extending 22½ degrees of latitude north and south of the aforesaid parallel of north latitude, 41 degrees, 48 minutes and 21 seconds. The meridional sides of the southern lobes are in the same manner formed in straight lines for one-half their length, so as to be exactly similar, as well as equal, to the northern lobes. The contiguous rectilinear portions of the equatorial sides of the northern and southern lobes are formed centrally. Since the southern lobes extend radially from the northern lobes, the sides of the respective southern lobes are spaced from each other by considerable distances.

A great advantage that arises from the form which the map thus assumes is that the several lobes can be folded upon one another into a very compact form, one-twelfth the size of the original map. Thus a map representing the land surface of the earth with great accuracy can be constructed on a very large scale and easily reduced to portable form.

I claim:—

A map of the earth comprising four northern and four southern lobes, each bounded by the equator and by two meridians spaced ninety degrees of longitude, the meridional edges of said lobes being distorted into straight lines for a distance corresponding to forty-five degrees latitude extending equally north and south of the parallel of latitude 41 degrees, 48 minutes, and 21 seconds, adjacent northern lobes being in contact with each other along said rectilinear portions of the meridional edges, the equatorial edges being similarly distorted throughout the same distance centrally thereof, and the southern lobes extending radially from the respective northern lobes and being connected therewith along the rectilinear portions of their equatorial edges, and two supplementary pairs of lobes equal and similar to the first-named lobes and filling the remaining angular space around the north pole, said supplementary lobes containing additional representations of the portions of the earth's surface represented at the outer first-named lobes.

In testimony whereof I have hereunto set my hand in the presence of two subscribing witnesses.

BERNARD J. S. CAHILL.

Witnesses:
 F. M. WRIGHT,
 D. B. RICHARDS.